(12) United States Patent
Cheng et al.

(10) Patent No.: US 8,000,306 B2
(45) Date of Patent: Aug. 16, 2011

(54) RANDOM ACCESS CHANNEL MESSAGE FORMAT FOR AN EXTENDED RANGE WIRELESS COMMUNICATION SYSTEM

(75) Inventors: Fang-Chen Cheng, Randolph, NJ (US); Jung A. Lee, Pittstown, NJ (US); Lei Song, Randolph, NJ (US); Said Tatesh, Swindon (GB); Henry H. Ye, Ledgewood, NJ (US)

(73) Assignee: Alcatel Lucent, Paris (FR)

( * ) Notice: Subject to any disclaimer, the term of this patent is extended or adjusted under 35 U.S.C. 154(b) by 1093 days.

(21) Appl. No.: 11/741,068

(22) Filed: Apr. 27, 2007

(65) Prior Publication Data

US 2008/0267134 A1    Oct. 30, 2008

(51) Int. Cl.
*H04J 3/06* (2006.01)
(52) U.S. Cl. .................. 370/335; 370/350
(58) Field of Classification Search ............ 370/210, 370/335, 503, 516, 517, 350
See application file for complete search history.

(56) References Cited

U.S. PATENT DOCUMENTS
2008/0232240 A1 * 9/2008 Baum et al. ............. 370/210

OTHER PUBLICATIONS

Source Ericcson, Doc No. R1-071889—TSG-RAN WG1 LTE TDD Ad Hoc—Creation of Idle Period for E-UTRA TDD Item No. 3.1.*
Source Ericcson, Doc No. R1-071891—TSG-RAN WG1 LTE TDD Ad Hoc RACH design for E-UTRA TDD Item No. 3.4.*
Source Ericcson, Doc No. R1-072450—TSG-RAN WG1 #49 Summary of e-mail discussion on timing alignment for random access in TDD.*
Source Ericcson, Doc No. R1-071887—TSG-RAN WG1 AdHoc on TDD LTE Idle Period for E-UTRA TDDAgenda Item No. 3.1.*

* cited by examiner

*Primary Examiner* — George Eng
*Assistant Examiner* — Nizar Sivji
(74) *Attorney, Agent, or Firm* — Williams, Morgan & Amerson, P.C.

(57) ABSTRACT

The present invention provides a method for transmitting and receiving random access channel messages in an extended range wireless communication system. One embodiment of the method may include accumulating, at a base station, signal energy received during a first portion of a transmission time interval. The method may also include accumulating, at the base station, signal energy received during a second portion of the transmission time interval. The first and second portions are offset from the start or end of the transmission time interval by selected delay intervals. The method may further include detecting the message(s) based on the signal energy accumulated during the first and second portions of the transmission time interval.

18 Claims, 5 Drawing Sheets

RANDOM ACCESS CHANNEL MESSAGE FORMAT FOR AN EXTENDED RANGE WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Wireless communication systems typically include one or more base stations or access points for providing wireless connectivity to mobile units in a geographic area (or cell) associated with each base station or access point. Mobile units and base stations communicate by transmitting modulated radiofrequency signals over a wireless communication link, or air interface. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, control channels, and the like.

Mobile units can initiate communication with the base station by transmitting a message on one or more of the random access channels (RACHs). Uplink random access messages are non-synchronized and therefore may be transmitted at any time based on the synchronized downlink timing by any mobile unit within the coverage area of the base station. The receiver in the base station must therefore continuously monitor the random access channels and search the signals received on the random access channels for predetermined sequences of symbols (sometimes referred to as the RACH preamble) in random access messages transmitted by mobile units. To make the search process feasible, the format of the random access messages must be standardized. For example, conventional random access messages in the Universal Mobile Telecommunication Sservices (UMTS) Long Term Evolution (LTE) system are transmitted in a subframe during a transmission time interval (TTI) of 1 ms in 1.08 MHz bandwidth. The random access messages subframe is divided into a 0.8 ms preamble and a 102.6 µs cyclic prefix that includes a copy of a portion of the sequence of symbols in the preamble. The remaining 97.4 µs in the transmission time interval is reserved as a guard time to reduce or prevent inter-symbol interference between different random access messages.

The coverage area of a base station is related to the duration of the cyclic prefix and the guard time. For example, the conventional a guard time of approximately 0.1 ms corresponds to a round-trip delay for a signal that travels approximately 15 kilometers. Thus, a random access channel message format that includes approximately 0.1 ms for the guard time is appropriate for reducing or preventing inter-symbol interference for coverage areas or cell sizes having a radius of up to approximately 15 kilometers. Similarly, the duration of the cyclic prefix is related to the size of the coverage area. For example, a cyclic prefix of approximately 0.1 ms is suitable for coverage areas having radii of up to approximately 15 kilometers. Although a range of 15 km may be considered sufficient for conventional wireless communication systems, the base station range of proposed wireless communications systems, such as the UMTS LTE, is expected to increase to at least 100 km. Proposals to extend the range of the random access channel supported by base stations include increasing the transmission time interval to 2 ms.

FIG. 1 shows a first proposed modification to a random access message 100. In this proposal, the extended transmission time interval includes a 0.8 ms RACH preamble 105. The length of the cyclic prefix (CP) 110 increases in proportion to the desired coverage area. For example, every 0.1 ms of additional cyclic prefix length will account for additional 15 km coverage. The guard time 115 also increases at the same rate as the cyclic prefix length. Thus, with the 0.8 ms RACH preamble, the time available for guard time and cyclic prefix is 2 ms−0.8 ms=1.2 ms. This RACH range extension proposal attempts to reduce the receiver complexity of the RACH preamble detection.

FIG. 2 conceptually illustrates one conventional RACH receiver 200. The receiver 200 monitors signals received within the 2 ms transmission time interval of the random access channel. If the mobile unit is very close to the receiver 200, then the subframe may begin very near the beginning of the transmission time interval, as indicated by the subframe 205. However, if the mobile unit is near the edge of the coverage area of the base station, and the subframe may begin very late in the transmission time interval, as indicated by the subframe 210. A conventional preamble detection scheme may be used in this range extension scenario by shifting the starting reference time to the end of extended cyclic prefix, e.g., by shifting the Fast Fourier Transform data collection window by 0.6 ms for a 90 km coverage area, as shown in FIG. 2. The accumulated data can then be processed to search for a peak over a delay of approximately 0.6 ms.

Two partitions between cyclic prefix and guard period can be envisioned: In one case, the 1.2 ms portion of the subframe that is not allocated to the preamble could be evenly allocated to the cyclic prefix and the guard time so that the RACH coverage is extended to 90 km as shown in FIG. 2. Alternatively, the 1.2 ms portion of the subframe that is not allocated to the preamble could be unevenly distributed between the cyclic prefix length and the guard time. The uneven distribution of the allocated time to the cyclic prefix and the guard time could extend the coverage to the 100 km if the cyclic prefix length is equal to or greater than 0.667 ms. However, inter-symbol interference may occur when the cyclic prefix and guard time allocations are uneven in cases where the preamble is transmitted by a mobile unit near the cell edge. However, the signal strength received from mobile units is the edge of an extended cell, e.g., mobile units that are as much as 90 or 100 km from the base station, may be very low, which may reduce the likelihood of detecting the preamble of the random access channel message.

FIG. 3 shows a second proposed modification to a random access message 300. In this proposal, the RACH preamble 305(1-2) is repeated within each subframe 300. The energy of both RACH preambles 305(1-2) may then be accumulated for detection. The accumulated RACH preamble energy may provide the additional link performance gain to help overcome the propagation loss due to the long range. Simulation results have shown that a gain of 2.3 dB may be achieved for a false alarm probability of $10^{-3}$ in the AWGN channel. However, repeating the RACH preamble 305(1-2) reduces the time available for the cyclic prefix and the guard time. For example, if the subframe 300 includes to 0.8 ms RACH preambles 305(1-2), only 0.4 ms are left for the cyclic prefix 310 and guard time 315. The cyclic prefix length may then be set at 0.1 ms and the remaining 0.3 ms can be allocated to the guard time to extend the coverage from around 15 km to 45 km without generating inter-symbol interference. However, maintaining the cyclic prefix at 0.1 ms requires a RACH preamble detection scheme that implements testing of multiple hypotheses for users in the range larger than 15 km.

FIG. 4 conceptually illustrates one embodiment of a receiver 400 that implements multiple hypotheses testing to detect a RACH preamble over an extended range. The receiver 400 implements a set of parallel RACH preamble detection processes that each detect a disjoint range of possible RACH transmission location. For example, each of the parallel RACH preamble detection processes may compare the received signal to a reference signal such as the reference signals 1-N shown in FIG. 4. Each of the reference signals 1-N may be used to detect RACH preambles from users in different distance ranges. For example, one reference signal (and associated parallel detection process) may be used to detect users in the range of 0-15 km, another reference signal (and associated parallel detection process) may be used to detect users in the range of 15-30 kilometers, and another reference signal (and associated parallel detection process) may be used to detect users in the range of 30-45 km. However, the receiver 400 is much more complicated to implement and operate than conventional receivers, such as the RACH receiver 200 shown in FIG. 2. Moreover, the RACH detection range of the receiver 400 is limited to around 45 km.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for transmitting and receiving random access channel messages in an extended range wireless communication system. One embodiment of the method may include accumulating, at a base station, signal energy received during a first portion of a transmission time interval. The method may also include accumulating, at the base station, signal energy received during a second portion of the transmission time interval. The first and second portions are offset from the start or end of the transmission time interval by selected delay intervals. The method may further include detecting the message(s) based on the signal energy accumulated during the first and second portions of the transmission time interval.

BRIEF DESCRIPTION OF THE DRAWINGS

The invention may be understood by reference to the following description taken in conjunction with the accompanying drawings, in which like reference numerals identify like elements, and in which.

Figure 1:
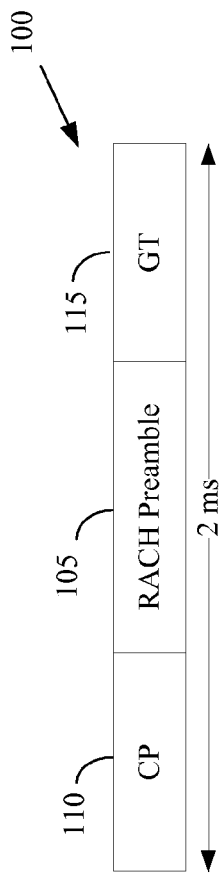
FIG. 1 shows a first proposed modification to a random access message.
Figure 3:
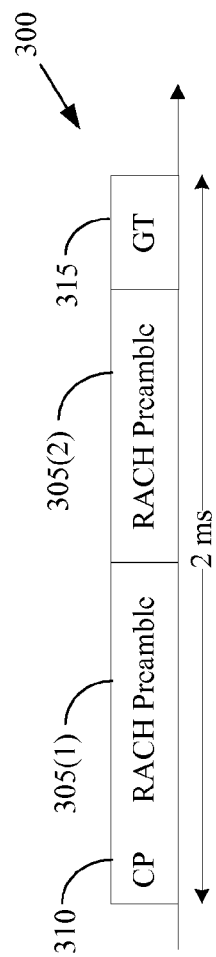
FIG. 3 shows a second proposed modification to a random access message.
Figure 2:
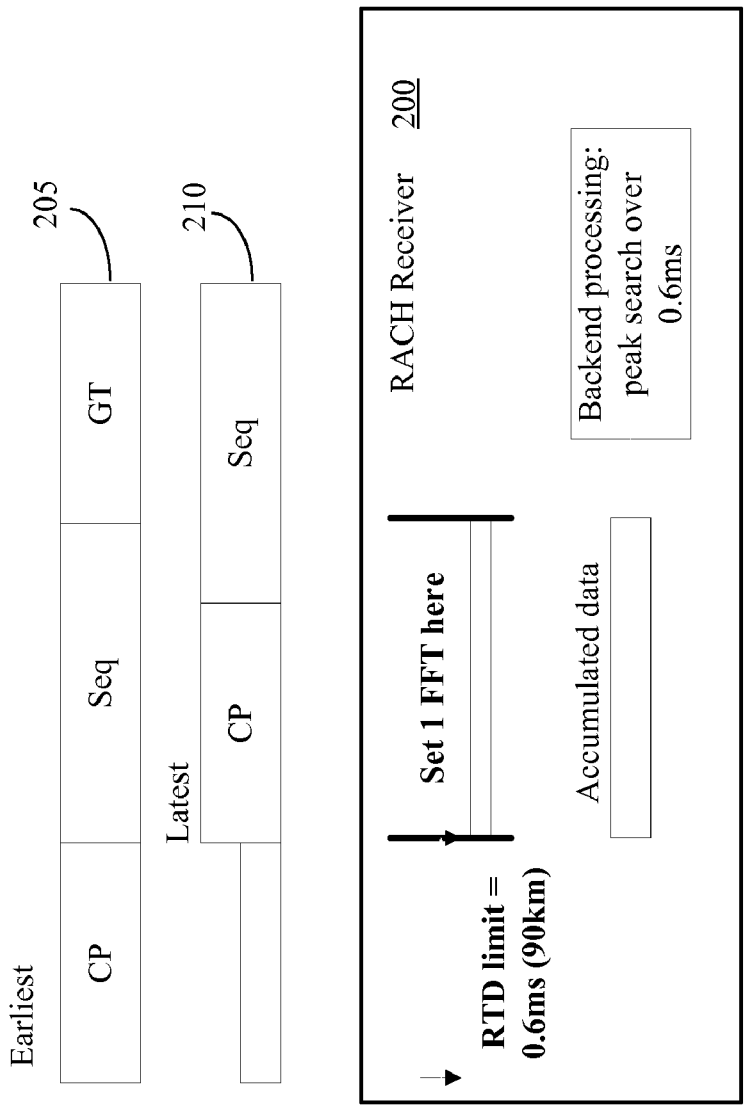
FIG. 2 conceptually illustrates one conventional RACH receiver.
Figure 4:
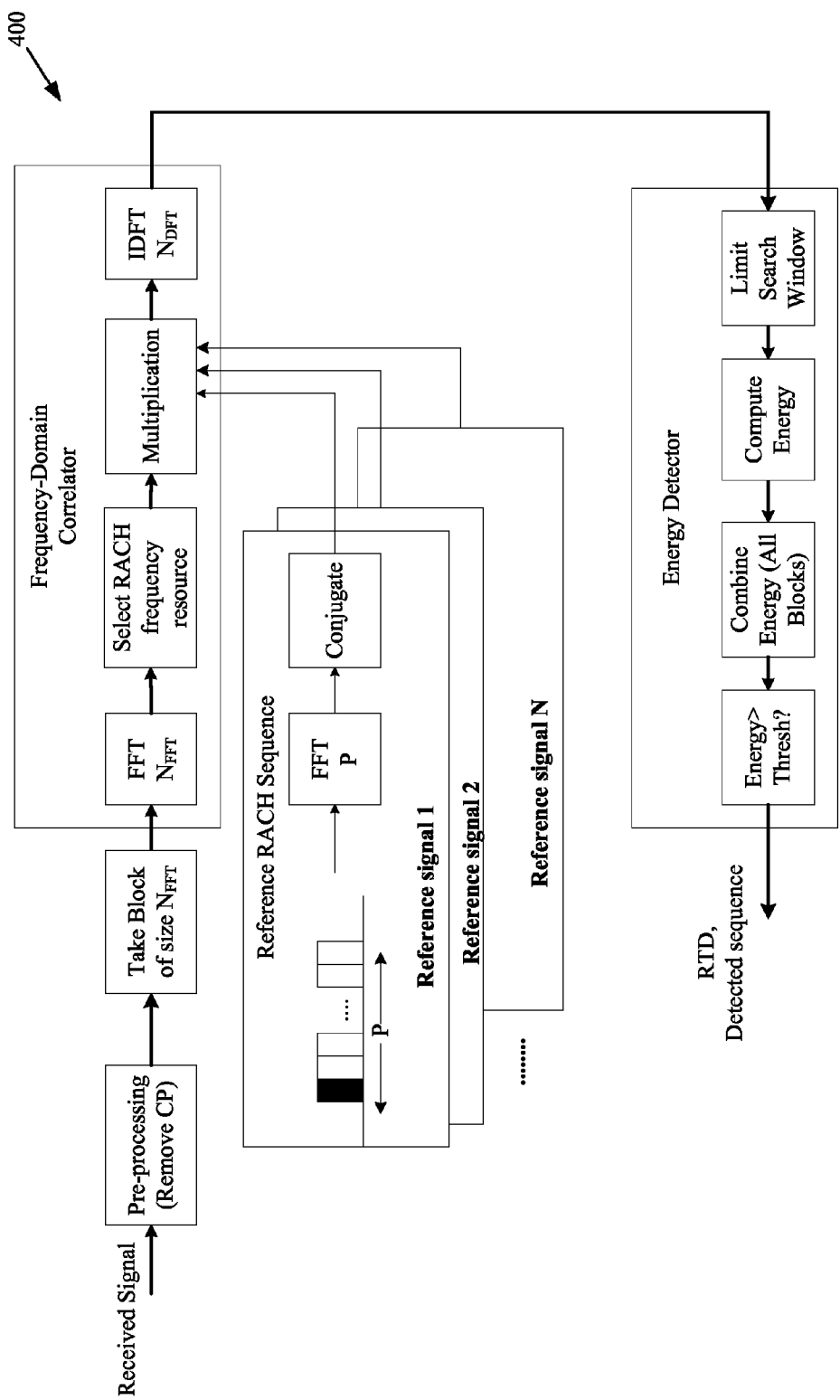
FIG. 4 conceptually illustrates one embodiment of a receiver that implements multiple hypotheses testing to detect a RACH preamble over an extended range.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 5:
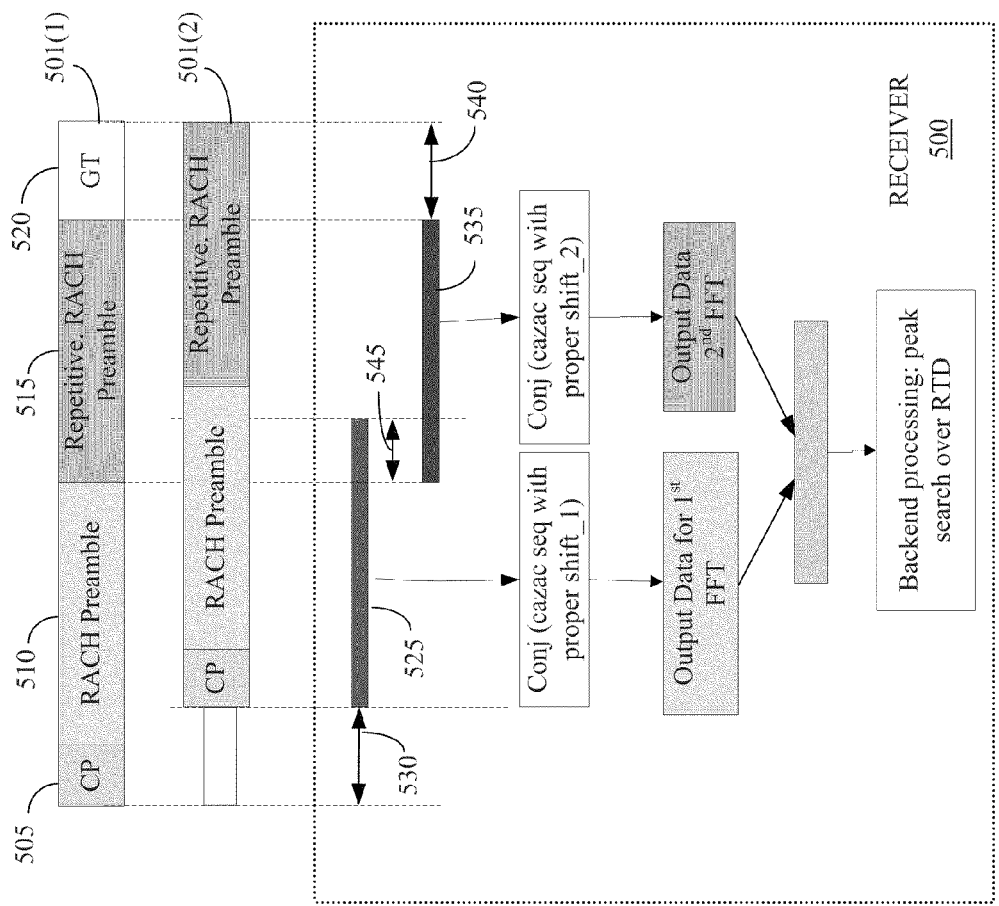
FIG. 5 conceptually illustrates one exemplary embodiment of a receiver, in accordance with the present invention.

FIG. 5 conceptually illustrates one exemplary embodiment of a receiver 500. In the illustrated embodiment, the receiver 500 is a part of a base station (not shown). However, persons of ordinary skill in the art having benefit of the present disclosure should appreciate that the present invention is not limited to receivers 500 that are implemented in base stations. In alternative embodiments, the receiver 500 may be implemented in any device used to provide wireless connectivity to one or more mobile units over an air interface. Exemplary devices include, but are not limited to, access points, access serving networks, access networks, and base station routers. The receiver 500 implements two processing threads that are used to process and/or analyze accumulated signal energy to detect messages provided by mobile units. The processing threads in the receiver 500 may function independently and/or concurrently to analyze portions of the received signal energy, i.e., the processing threads may operate in parallel. Persons of ordinary skill in the art having benefit of the present disclosure should appreciate that the processing threads may be implemented in a single physical processor, such as a central processing unit, that supports multiple threads or in multiple physical processors.

Messages transmitted to the receiver 500 by mobile units are formed according to a predetermined format. In the illustrated embodiment, random access channel messages 501(1-2) received from mobile units include a cyclic prefix 505, a sequence corresponding to a random access channel (RACH) preamble 510, a second sequence that also includes information based upon the RACH preamble 515, and a guard time 520. For example, the random access channel messages 501 may be transmitted in a 2 ms transmission time interval and may include a cyclic prefix 505 that is about 0.1 ms long, preambles 510, 515 that are both about 0.8 ms long, and a guard time that is about 0.3 ms long. Alternatively, the preambles 510, 515 of the random access channel messages 501 may have different durations. For example, the second sequence in the preamble 515 may only include a subset of the information in the first sequence. Consequently, the duration of the preamble 515 may be smaller than the duration of the preamble 510. The portion of the transmission time interval gained by truncating the preamble 515 may then be allocated to other portions of the message, such as the guard time 520, as will be discussed in detail below. Duplicating information in the preambles 510, 515 (or portions thereof) may improve link performance gain by increasing the accumulated energy used to decode information in the preambles 510, 515, particularly when the detection range of the base station has been extended beyond 15 km. As used herein, the term "detection range" will be understood to refer to the approximate distance at which the receiver 500 can detect a RACH message from a mobile unit with a selected (and relatively high) probability.

The receiver 500 monitors one or more channels, such as random access channels, that may be carrying information associated with a message transmitted by mobile unit. In the illustrated embodiment, each of the processing threads in the receiver 500 accumulates energy received on one or more random access channels during a portion of each transmission time interval. The time windows for accumulating the received signal energy are determined based upon the format of the received messages and the detection range associated with the base station. In the illustrated embodiment, the first processing thread accumulates signal energy during a first window 525 that is offset from the beginning of the transmission time interval by a first delay 530 to account for messages sent from users with the maximum delay. For example, the first window 525 may be offset by a first delay 530 that is approximately equal to the round-trip time (or delay) for a signal traveling from the base station to the detection range of the base station. The second processing thread accumulates signal energy during a second window 535 that is offset from the end of the transmission time interval by a second delay 540. For example, the second window 535 may be offset by a second delay 540 that is approximately equal to the guard time 520 associated with the messages 501 to account for the second RACH preamble for users with the minimum (or approximately zero) delay.

The durations of the windows 525, 535 are approximately equal to the duration of the preamble 510. In cases where the preambles 510, 515 are copies of each other, the durations of the windows 525, 535 are equal to each other and to the duration of the preamble 515. However, if the preamble 515 is shorter than the preamble 510 due to truncation of the preamble 515, then the duration of the windows 525, 535 may be longer than the duration of the preamble 515. The time windows 525, 535 for decoding the first and second preamble may overlap. In the illustrated embodiment, the duration of the overlap 545 is approximately equal to the sum of the difference between a maximal tolerable delay 530 and the duration of the cyclic prefix 505 and the difference between the duration of the first preamble 510 and the duration of the second preamble 515. Thus, if the maximal tolerable delay 530 and the duration of the cyclic prefix 505 are equal, and if the duration of the first and second preambles 510, 515 are equal, then there is no overlap between the windows 525, 535. On the other hand, if the first delay 530 and the duration of the cyclic prefix 505 are equal, and if the duration of the second preamble 515 is truncated to zero, then the windows 525, 535 completely overlap. The overlap may reduce the link performance gain achieved by duplicating the preambles 510, 515. However, implementing two overlapping windows 525, 535 may significantly reduce the complexity of the receiver 500 since only two processing threads are used to analyze the accumulated energy.

The two processing threads may form fast Fourier transforms (FFT) of the energy accumulated in the windows 525, 535. Conjugates of the two FFTs corresponding to the energy accumulated in the windows 525 may then be formed, e.g., using constant amplitude, zero autocorrelation (CAZAC) sequences with the appropriate shift. Techniques for forming the conjugates of FFTs using CAZAC sequences are known in the art and in the interest of clarity will not be discussed further herein. Output data for the two FFTs formed by the two processing threads are then combined and backend processing is used to search for a signal peak over delays ranging from zero to the round-trip delay corresponding to the detection radius of the base station, e.g., using an auto-correlation of the combined output data. If a peak is found in the accumulated signal energy, then the receiver 500 may have detected a message from a mobile unit and may proceed to decode this message and/or subsequent messages received on other channels. The receiver 500 may also use the message detected on the random access channel to synchronize the base station with the mobile unit that transmitted the message.

Figure 6:
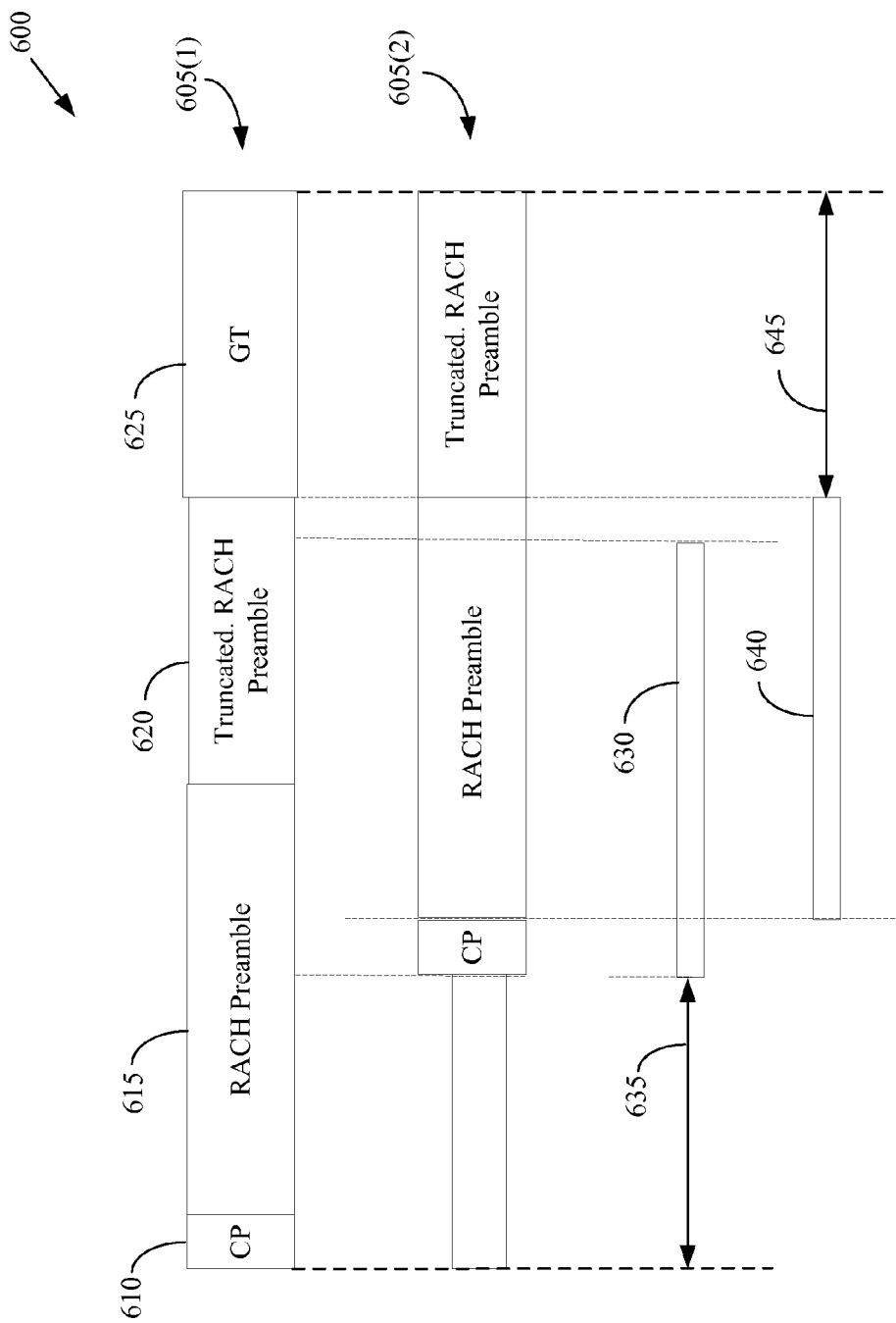
FIG. 6 conceptually illustrates one exemplary embodiment of a timing relationship, in accordance with the present invention.

FIG. 6 conceptually illustrates one exemplary embodiment of a timing relationship 600. In the illustrated embodiment, random access messages 605 include a cyclic prefix 610, a first preamble 615, a second preamble 620, and a guard time 625. The timing relationship 600 shows that the duration of a first signal energy accumulation window 630 is offset from the beginning of the transmission time interval by a first delay 635 that is approximately equal to the round-trip time (or delay) for a signal traveling to the detection range of the base station. The second window 640 is offset from the end of the transmission time interval by a second delay 540 that is approximately equal to the guard time 625. The durations of the windows 630, 640 are approximately equal to the duration of the preamble 615.

The repetitive RACH preamble format with flexible detection scheme shown in FIG. 6 enables a receiver to accumulate preamble energy for link performance gain over an extended range with reduced receiver complexity. However, the extended range may be limited by the guard time interval 625, which is 0.3 ms in embodiments that repeat the first preamble 615 to form the second preamble 620. The 0.3 ms guard time interval provides coverage to a detection range of around 45 km. To further extend the RACH coverage to detection ranges of 90-100 km, the second preamble 620 is truncated to allow a longer guard time 625. However, the truncated RACH preamble may reduce the link performance gain at the receiver since the overlapped portion of the first and second windows 630, 635 increases. The additional range extension over the original 45 km depends on the length of the truncation. In one embodiment, the truncated RACH preamble in the 2 ms TTI could enable the detection range to be extended to up to 90 km if the guard time 625 is increased to 0.6 ms. The flexible RACH structure with truncated preamble 620 could also allow the system to dynamically adjust its coverage area from 45 km to 90 km by varying the truncation. Selection of the truncation could be done when the receiver is initially configured and/or the truncation could be modified after the receiver has been deployed. The flexible RACH structure would also minimize the receiver complexity of the RACH preamble detection.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
   accumulating, at a base station, signal energy received during a first portion of a transmission time interval, the first portion being offset from the start of the transmission time interval by a first delay determined based on a detection range of the base station and the duration of the first portion corresponding to a duration of a first sequence in at least one message provided by at least one mobile unit;
   accumulating, at the base station, signal energy received during a second portion of the transmission time interval, the second portion being offset from the end of the transmission time interval by a second delay determined based on a guard time associated with said at least one message and the duration of the second portion corresponding to a duration of the first sequence in said at least one message provided by said at least one mobile unit;
   detecting said at least one message based on the signal energy accumulated during the first and second portions of the transmission time interval.

2. The method of claim 1, wherein accumulating the signal energy comprises accumulating signal energy received over at least one random access channel.

3. The method of claim 2, wherein detecting the message comprises detecting at least one random access channel message provided by said at least one mobile unit over said at least one random access channel.

4. The method of claim 1, wherein accumulating signal energy received during the first portion of the transmission time interval comprises accumulating signal energy during the first portion that is offset from the start of the transmission time interval by a round-trip delay corresponding to the detection range of the base station.

5. The method of claim 1, wherein accumulating signal energy received during the second portion of the transmission time interval comprises accumulating signal energy during the second portion that is offset from the end of the transmission time interval by a second delay that is approximately equal to a guard time associated with said at least one message.

6. The method of claim 5, wherein the second sequence corresponds to the first sequence, and comprising determining the guard time and the duration of a cyclic prefix associated with said at least one message based on the duration of the first sequence.

7. The method of claim 5, wherein the second sequence corresponds to a subset of the first sequence and comprising determining the guard time and the duration of a cyclic prefix associated with said at least one message based on the duration of the first and second sequences.

8. The method of claim 7, comprising selecting the subset of the first sequence that is used to form the second sequence based on the detection range of the base station.

9. The method of claim 1, wherein detecting said at least one message comprises detecting said at least one message using a first Fourier transform formed based on the accumulated signal energy received during the first portion of the transmission time interval and a second Fourier transform formed based on the accumulated signal energy received during the second portion of the transmission time interval.

10. The method of claim 9, wherein detecting said at least one message comprises detecting said at least one message using the first Fourier transform formed by a first processor and the second Fourier transform formed by a second processor.

11. A method, comprising:
    providing, from a mobile unit, at least one message during a transmission time interval, said at least one message comprising a first sequence and a second sequence such that the message can be detected by a base station using signal energy accumulated at the base station during a first portion and a second portion of the transmission time interval, the first portion being offset from the start of the transmission time interval by a first delay determined based on a detection range of the base station and the duration of the first portion corresponding to a duration of the first sequence, and the second portion being offset from the start of the transmission time interval by a second delay determined based on a guard time associated with said at least one message and the duration of the second portion corresponding to a duration of the second sequence.

12. The method of claim 11, wherein providing said at least one message comprises providing at least one random access channel message over at least one random access channel.

13. The method of claim 12, wherein providing said at least one random access channel message comprises providing at least one random access channel message including a guard time and a cyclic prefix formed based on the first sequence.

14. The method of claim 13, wherein providing said at least one random access channel message including the cyclic prefix and the guard time comprises providing said at least one random access channel message such that the durations of the cyclic prefix and the guard time are determined based on the transmission time interval and durations of the first and second sequences.

15. The method of claim 14, wherein providing said at least one random access channel message comprises providing a second sequence that corresponds to the first sequence and has a duration that is approximately equal to the duration of the first portion.

16. The method of claim 14, wherein providing said at least one random access channel message comprises providing a second sequence that corresponds to a subset of the first sequence and has a duration that is shorter than the duration of the first portion.

17. The method of claim 16, comprising selecting a subset of the first sequence that is used to form the second sequence based on the detection range of the base station.

18. The method of claim 17, wherein providing said at least one random access channel message comprises providing at least one random access channel message having a guard time selected based on the difference in the durations of the first and second sequences.

* * * * *